Jan. 21, 1936. A. E. GIBSON 2,028,598
DRAG LINE BUCKET
Filed Jan. 18, 1933
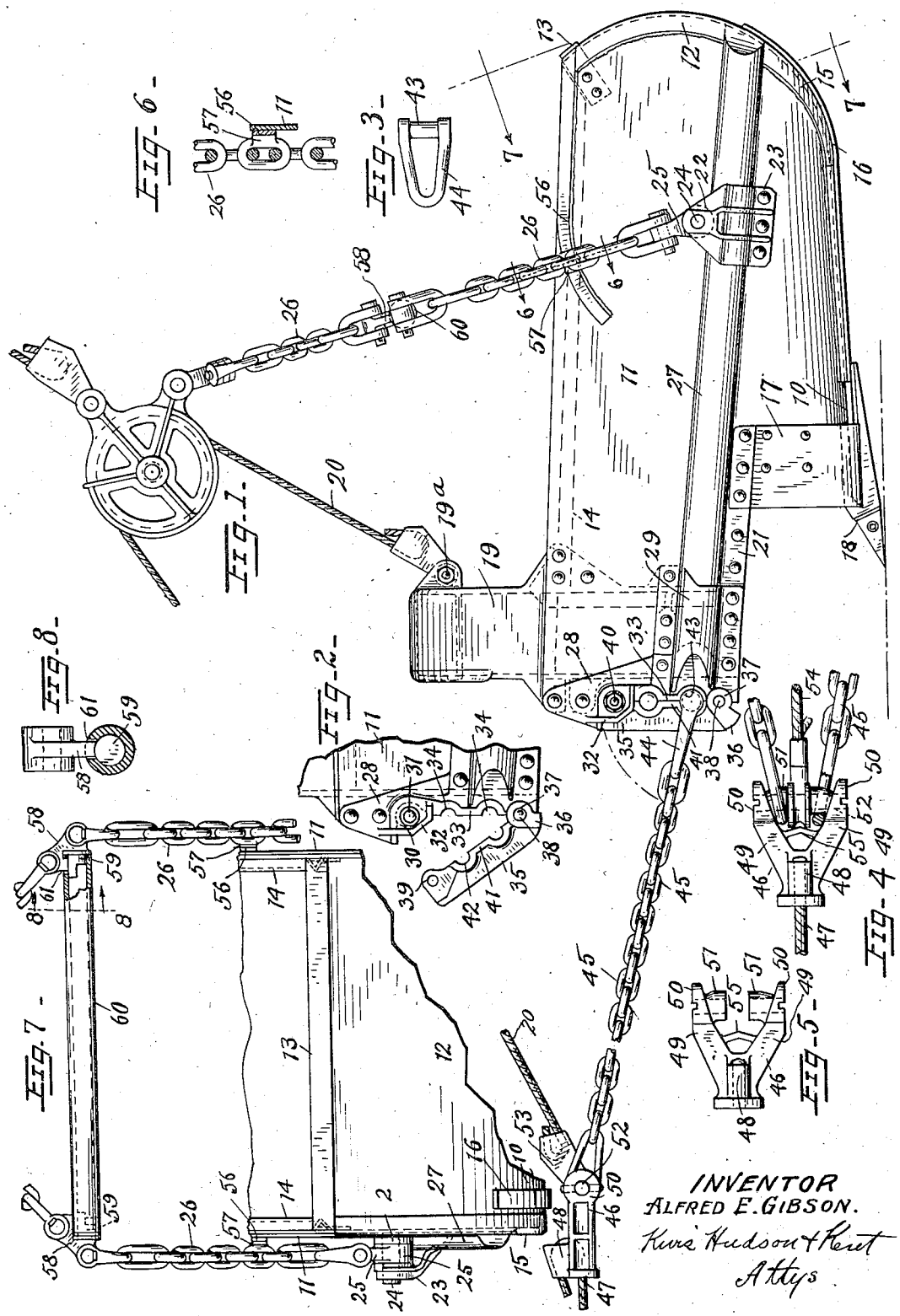
INVENTOR
ALFRED E. GIBSON.
Kwis Hudson + Kent
Attys Patented Jan. 21, 1936

2,028,598

UNITED STATES PATENT OFFICE 2,028,598

DRAG LINE BUCKET

Alfred E. Gibson, Cleveland Heights, Ohio, assignor to The Wellman Engineering Company, Cleveland, Ohio, a corporation of Ohio Application January 18, 1933, Serial No. 652,349

8 Claims. (Cl. 37—135)

This invention relates to excavating buckets of the drag line type.

In buckets of the drag line type, the drag or hauling lines or chains are connected to the sides of the bucket adjacent the forward end thereof and usually forwardly of the digging edge of the bucket.

Customarily, hitch castings are provided adjacent the forward ends of the sides of the bucket and the shackles or clevises at the bucket end of the drag or hauling chains or lines are secured to these castings by removable hitch pins extending through the shackles and castings.

The severe service to which drag line buckets are subjected quickly causes hitch pins to loosen with the result that the pins and the castings adjacent the pin holes rapidly wear, often resulting in loss of the pins and a consequent interval during which the bucket is idle while the pins are being replaced and the shackles again connected to the pin castings.

One of the objects of the present invention is to provide in a drag line bucket an improved construction for the hitch castings, drag line shackles, and hitch pins thereof which reduces the wear upon the castings and pins and obviates the danger of the pins working loose and being lost with a resultant loss of services of the bucket.

Another object is to provide in a drag line bucket an improved construction for the hitch castings that will enable the use therewith of shackles and hitch pins formed as an integral unit, such as a solid one-piece casting.

The drag cables of drag line buckets are provided at one end with a socket or shackle to which are connected the forward ends of the drag chains or lines of the bucket. Heretofore, the end rings of the drag chains have been connected to the drag cable socket by a pin extending through the socket and directly engaging the rings. This direct engagement between the rings and pin resulted in quickly wearing the pin down and in its ultimate failure or bending. In some instances, the drag line socket has been constructed to provide more than two bearing supports for the pin to lessen the effect of the wear thereon and to prevent the bending thereof. This arrangement has not proven entirely satisfactory and is open to the objection that the drag line socket is made more complicated.

A further object of the invention is to provide an improved construction for the drag cable sockets of drag line buckets and one wherein the pins are protected against wear and the tendency to bend.

The hoisting and dumping chains of drag line buckets are connected to the sides of the buckets intermediate the ends thereof and somewhat toward the rear and below the top edges of the buckets. These chains extend upwardly above the top edges of the buckets and then inwardly to the socket for the hoisting cable as is well understood. The swinging movement of the buckets in operation causes the links of the hoisting or dumping chains to rub against the sides of the buckets adjacent their upper edges, with the result that the chains and bucket sides are quickly worn.

A further object of the invention is to provide a drag line bucket construction wherein those portions of the bucket and the hoisting or dumping chains which are subject normally to excessive wear during the use of the bucket are provided with protective means against such wear.

Another object of the invention is to provide an improved spreader arm construction for the hoisting or dumping chains of a drag line bucket.

Additional and further objects and advantages will become apparent hereinafter during the detailed description of an embodiment thereof which is to follow and which is illustrated in the accompanying drawing wherein:

Figure 1 is a side elevational view of a drag line bucket;

Fig. 2 is a fragmentary detail side elevational view thereof showing the hitch cap in open position with respect to the hitch casting;

Fig. 3 is a detail view of the shackle and hitch pin unit of the drag or hauling chains;

Fig. 4 is a fragmentary plan view of the drag cable socket with the hold line and the drag chains connected thereto, certain parts of the drag chains being broken away;

Fig. 5 is a detached detail view of the drag cable socket;

Fig. 6 is a sectional view taken substantially on line 6—6 of Fig. 1, looking in the direction of the arrows;

Fig. 7 is a fragmentary view taken from the rear of the bucket looking in the direction of the arrows 7—7 of Fig. 1, and Fig. 8 is a sectional view taken substantially on line 8—8 of Fig. 7 looking in the direction of the arrows.

The drag line bucket illustrated in the drawing comprises a bottom 10, sides 11, and curved back 12, and may be formed from either a single blank or from separate blanks of suitable gauge sheet metal cut and stamped or bent into the desired shape and having the adjacent edges of the sides 11 and back 12 secured together by suitable means, such as by welding, as is well understood in the art.

The upper rear corners and the upper edge of the back 12 of the bucket are reenforced by a strap 13 secured thereto and to the sides 11, while the upper edges of the sides 11 are reenforced by forwardly extending members 14 secured thereto by welding or by other suitable securing means. The bottom and sides of the bucket at the rear corners thereof are reenforced by heavy corner castings 15 secured thereto exteriorly of the bucket, while flat bars 16 extend substantially the full length of the bottom on the under side of the bucket and partly up the back 12 and act as runners for the bucket as well as additionally reenforcing the same.

The sides 11 project beyond the cutting or digging lip or edge of the bucket, which sides, together with said lip or edge, are braced or reenforced by a broad arched plate 17 that extends upwardly on both sides and across the bottom of the bucket and is secured to the sides and bottom thereof by riveting or by other suitable means, the forward edge of the plate being beveled and cooperating with the bevel teeth 18 in the digging operation.

In order to resist the pulling-in strains to which the sides 11 of the bucket are subjected in use, a heavy steel bridge or arch 19 extends upwardly between the sides forwardly of the cutting or digging lip or edge, it being noted that said bridge or arch 19 on each side extends to the bottom edge of the forwardly extending portions of the sides 11 and that it is securely riveted or otherwise secured to said sides. The bridge or arch 19 may be of any preferred construction, such as a casting provided with laterally extending flanges forming in part the means by which the bridge is secured to the sides and also forming an attaching bracket 19a for the head cable 20, or the bridge may be built up of separate structural members secured together.

The front end of the bucket is further reenforced by strips 21 riveted or otherwise secured to the sides 11, arch plate 17, and hitch castings, later to be referred to, and extending along the lower edge of the sides from a point forwardly of the digging or cutting lip or edge to a point rearwardly thereof.

The sides 11 intermediate their ends and rearwardly of the transverse center line of the bucket are provided with bosses 22 and have secured thereto brackets 23 which extend outwardly and upwardly of the sides 11 and are provided at their upper ends with openings aligning with bearing recesses formed in the bosses 22, which openings and recesses form the supporting bearings for the pins 24 of the dumping bail trunnions 25. The hoisting or dumping chains 26, later to be referred to herein, are connected to the trunnions 25 at their lower ends.

In order to provide the requisite strength in the bucket and to enable the bucket to have a high load capacity ratio with respect to its weight, stiffening or reenforcing members 27 extend along the sides 11 from the extreme front edge thereof rearwardly of the brackets 23 and preferably to a point closely adjacent the back or rear end of the bucket. The members 27 are substantially channel shaped with the sides outwardly divergent and with the channels facing inwardly toward the sides 11. The members 27 are preferably welded to the sides 11 along their entire contacting surfaces and also to the brackets 23.

The forward ends of the sides 11 have secured thereto by riveting or other suitable means hitch castings 28 which have upwardly extending portions provided at their lower ends with rearwardly extending portions having blisters 29 formed therein and overlying the members 27.

The forward edges of the upwardly extending portions of the hitch castings 28 are provided adjacent their upper ends with spaced ears 30 having aligned openings 31 formed therein and are reenforced by lateral flanges 32. Beneath the ears 30 the castings are provided with lateral downwardly extending flanges 33 provided with vertically spaced semi-circular recesses 34, there being two such recesses shown in the drawing in each casting. It will be understood, of course, that the number of the recesses 34 may vary if desired. The lower ends of the forward edges of the castings 28 are provided with forwardly extending ears to which hitch caps 35, now to be described are connected.

The hitch caps 35 at their lower ends are provided with reenforcing bosses 36 terminating in spaced ears 37 which straddle the ears at the lower ends of the castings 28 and are secured thereto by hinge pins 38 extending through aligned bearing openings in the ears and preferably riveted in place although, if desired, these pins could be arranged to be readily removable.

The hitch caps 35 are provided at their upper ends with rearwardly extending ears 39 which fit between the ears 30 of the castings 28 and are locked in position therebetween by means of lock bolts 40 extending through the openings 31 in the ears 30 and an opening in the ears 39. The bolts 40 are such as to be capable of being quickly removed when desired.

The hitch caps between the ears 37 and the ears 39 are provided along their rear vertical edges with lateral flanges 41 having vertically spaced semi-circular recesses 42 formed therein which, when the hitch caps are in the position shown in Fig. 1 of the drawing, mate with the recesses 34 of the hitch castings 28 and form therewith circular reenforced openings for the hitch pins 43.

The hitch pins 43 are integral parts of the hitch shackles 44 carried by the bucket ends of the drag chains 45, the shackles 44 and pins 43 being preferably formed as single unit castings.

It will be seen that the drag chains 45 may be readily connected to the hitch castings by merely passing the shackles 44 and pins 43 over the hitch caps and then swinging the caps upwardly against the hitch castings and locking the same in such position by means of the lock bolts 40, it being understood that the hitch pins 43 are positioned in the desired openings formed by the recesses 34 and 42.

The end links of the drag chains 45 at the forward ends of the chains are connected to the drag cable socket 46 of the drag cable 47. The socket 46 is in the form of an integral casting and is provided adjacent its forward end with the usual clamping means 48 for the cable 47, while at its rear end it is formed with a pair of divergent arms 49 terminating in circular portions 50 having on their inner sides inwardly extending circular bosses 51.

The end links of the drag chains 45 are positioned over these bosses 51 which receive the strains imparted to the chains during operation of the bucket. A pin 52 extends through aligned openings in the portions 50 and bosses 51, such pin receiving intermediate the bosses 51 the clamp 53 for the head cable 20. The pin 52 is locked in position by some suitable means. A rod or bar like member 55 extends between the arms 49 forwardly of the bosses 51 to limit the forward movement of the end links of the chains 45 upon the bosses 51.

It will be seen that the pin 52 is not directly engaged by the end links of the chains 45 and, therefore, will not be subjected to wear or bending during the use of the bucket, since all of the wear and strain is assumed by the bosses 51.

The swinging of the bucket in operation has resulted in the sides thereof becoming worn since the hoisting and dumping chains engage the same adjacent the upper edges of the bucket. Therefore, in order to obviate this condition, it is proposed to provide the sides 11 of the bucket with reenforcing or wear strips 56 adjacent their upper edges which strips have portions curved concentrically to the tilting axis of the bucket. The strips 56 may be formed integrally with the sides 11 or they may be separate members secured thereto by welding, riveting, or other suitable means.

It is also proposed to protect the hoisting and dumping chains 26 by providing the links thereof which engage with the strips 56 with lugs 57 arranged to contact with the strips, and to hold the chains 26 out of engagement with the sides at other points.

Ordinarily the hoisting chains extend upwardly and are connected at their upper ends to a sheave block, a spreader bar being arranged between the chains intermediate their ends.

It is proposed to have the hoisting chains in the present construction formed in two sections and to connect shackles at the upper ends of the lower sections and shackles at the lower ends of the upper sections by means of connecting pins to bosses on plates 58, which plates are substantially triangular in shape and have enlarged portions 59 at their inner sides. A tubular spreader bar 60 is arranged between the hoisting chains and is provided at its opposite ends with slots 61 wherefore the plates 58 may be passed through the slots 61 and the enlarged portions 59 arranged within the tubular spreader bar 60. The plates 58 and the bar 60 may then be integrally united by welding or other suitable means to form a strong and efficient spreader bar construction.

It will be seen that the construction of the hitch castings, hitch caps, and hitch pins and shackle units is such that the wear upon the castings and pins is greatly eliminated since there is no danger of the pins working loose and further that the hitch pins may be quickly disconnected from the hitch casting.

It will also be noted that the construction of the drag cable socket eliminates wear upon the connecting pin and the tendency of the pin to bend consequent thereto.

Likewise, it will be observed that the present construction adequately protects the sides of the bucket and the hoisting chains from wear because of the tilting movements of the bucket in operation.

In addition the spreader bar and hoisting chains of the present construction are united into a strong and integral structure.

Although a preferred form of the invention has been illustrated and described herein, it will be understood that the invention is susceptible of various modifications and adaptations within the scope of the appended claims.

Having thus described my invention, I claim:

1. In a bucket of the drag line type, attaching means for the drag lines or chains arranged at the forward ends of the sides of the bucket and comprising hitch members secured to the sides and separate cap members connected to said hitch members so as to be movable relative thereto.

2. In a bucket of the drag line type, attaching means for the drag lines or chains arranged at the forward ends of the sides of the bucket and comprising hitch members secured to the sides and cap members pivotally connected to said hitch members.

3. In a bucket of the drag line type, attaching means for the drag lines or chains arranged at the forward ends of the sides of the bucket and comprising hitch members secured to the sides, cap members pivotally connected adjacent one end to said hitch members, and means adjacent the other end of said cap members cooperating with means on said hitch members for securing said members together.

4. In a bucket of the drag line type, attaching means for the drag lines or chains arranged at the forward ends of the sides of the bucket and comprising hitch members secured to the sides and separate cap members connected to said hitch members so as to be movable relative thereto, said hitch members and said cap members having cooperating complementary recesses forming when said members are brought together receiving openings for a hitch pin.

5. In a bucket of the drag line type, attaching means for the drag lines or chains arranged at the forward ends of the sides of the bucket and comprising hitch members secured to the sides, cap members pivotally connected to said hitch members to be swung to a position thereagainst or to a position outwardly thereof, and means for securing said cap members in position against said hitch members, said hitch members and said cap members being provided with complementary recesses forming when said members are secured together hitch pin receiving openings.

6. In a bucket of the drag line type, in combination, attaching means for the drag lines or chains arranged at the forward ends of the sides of the bucket comprising hitch members secured to the sides and separate cap members connected to said hitch members, and hitch shackle and pin units on the ends of the drag lines or chains and encircling said cap members.

7. In a bucket of the drag line type, in combination, attaching means for the drag lines or chains arranged at the forward ends of the sides of the bucket and comprising hitch members secured to the sides, cap members pivotally connected to said hitch members and means for securing said cap members against said hitch members, and hitch shackle and pin units on the ends of the drag lines or chains and encircling said cap members.

8. In a bucket of the drag line type, attaching means for the drag lines or chains arranged at the forward ends of the sides of the bucket and comprising hitch members fixedly secured to the sides of the bucket and separate cap members directly connected to said hitch members and by means of said hitch members indirectly connected with the bucket.

ALFRED E. GIBSON.